Figure 7:
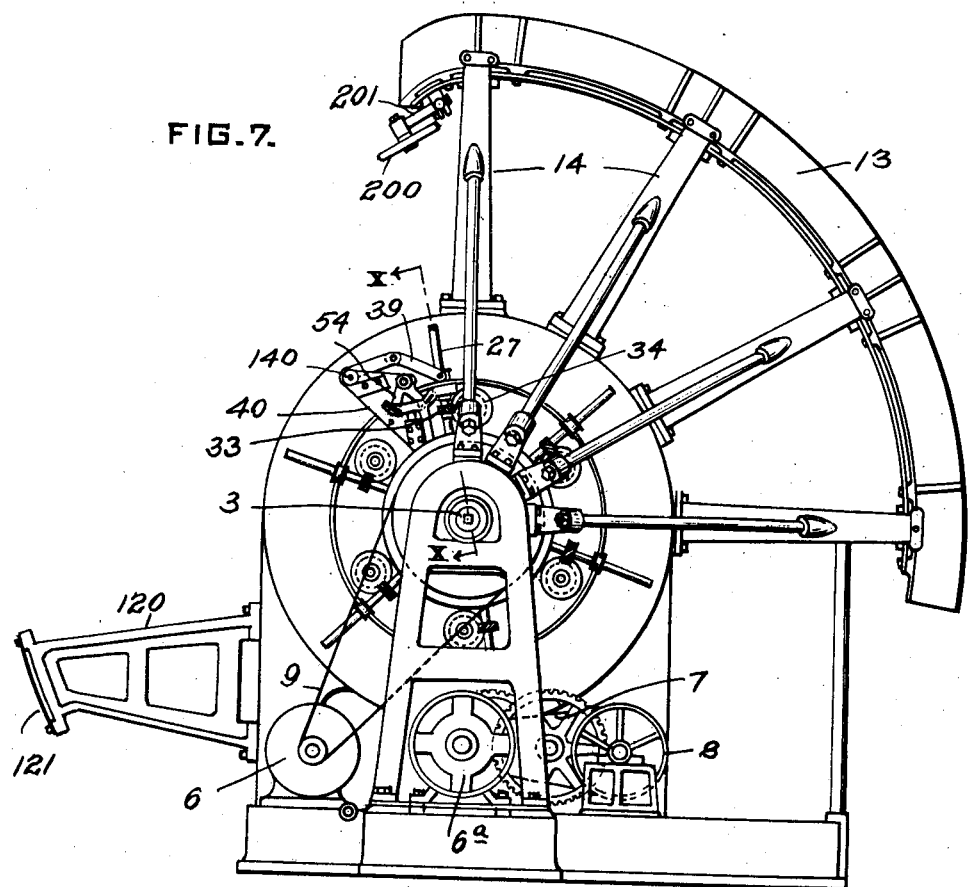

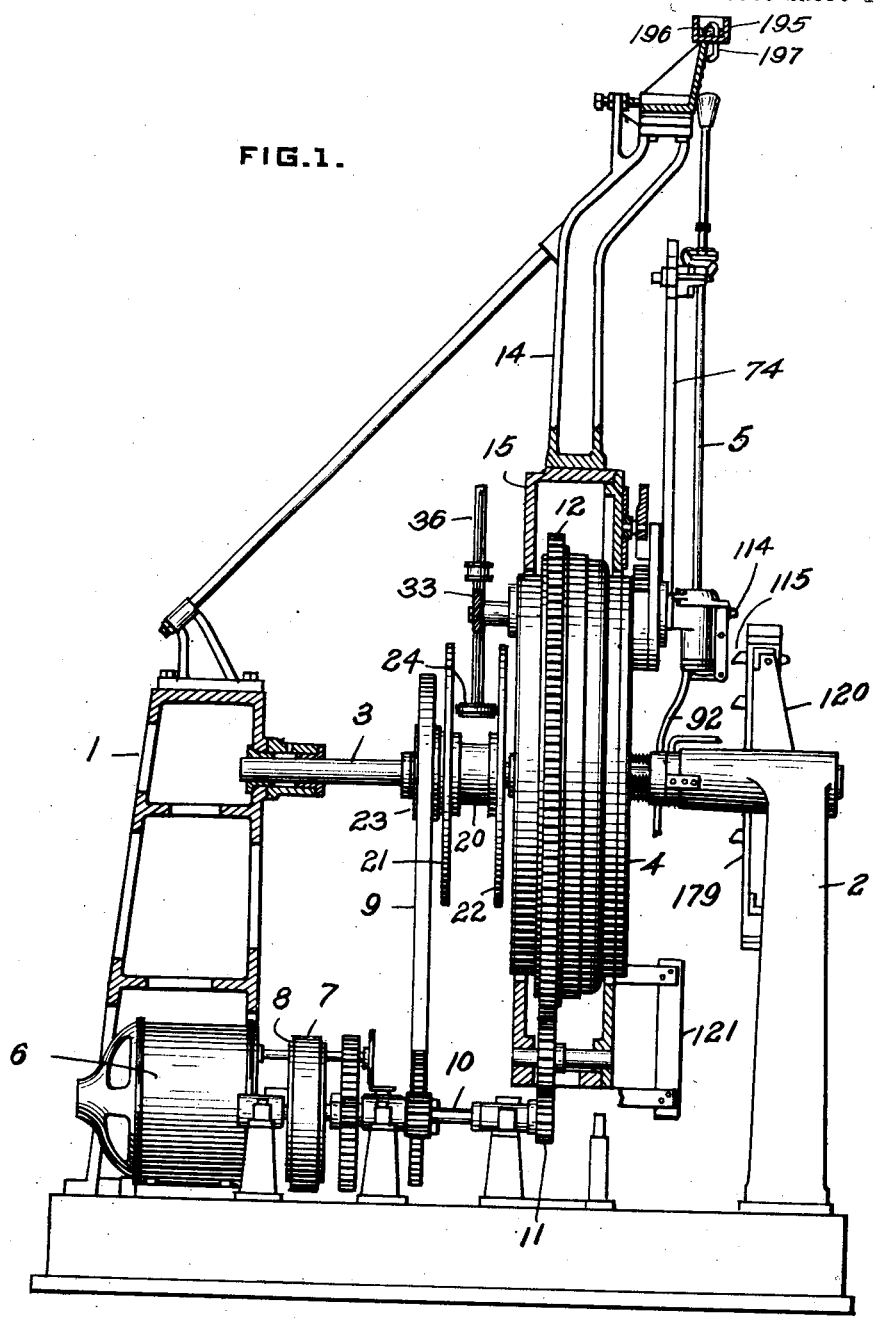

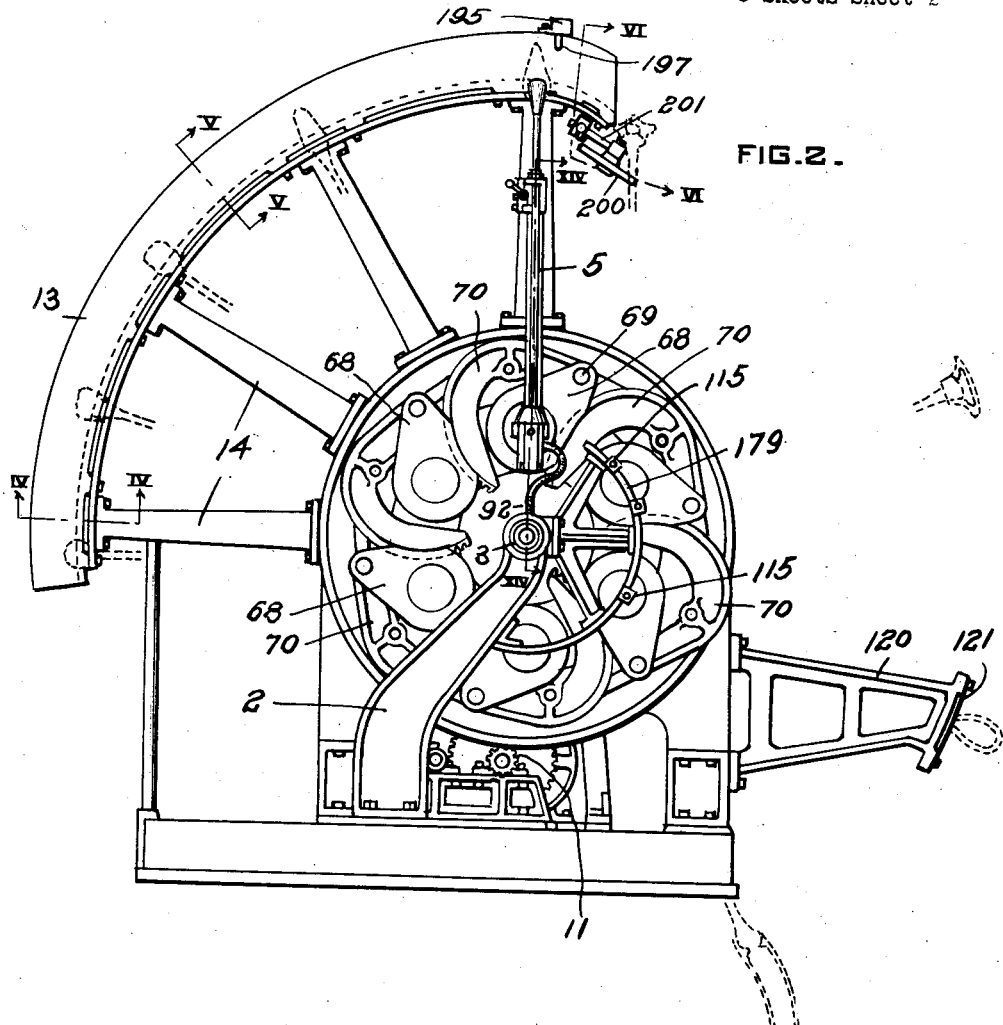
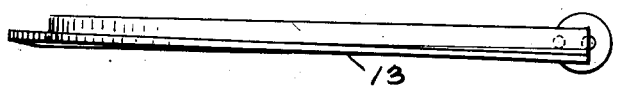
  

Jan. 18, 1927.

T. H. SLOAN 1,614,632

GLASS FORMING MACHINE

Filed April 26, 1926    9 Sheets-Sheet 3

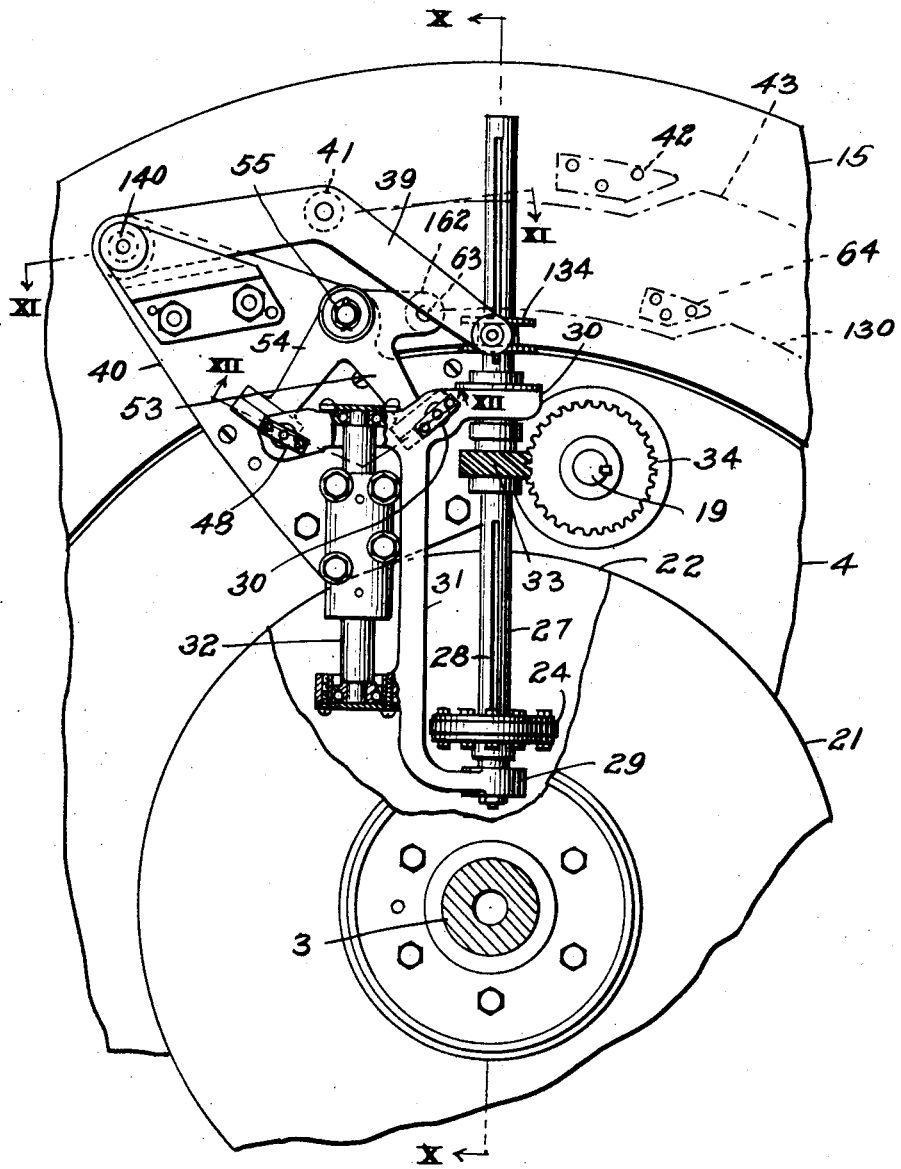

Jan. 18, 1927. 1,614,632
T. H. SLOAN
GLASS FORMING MACHINE
Filed April 26, 1926   9 Sheets-Sheet 5
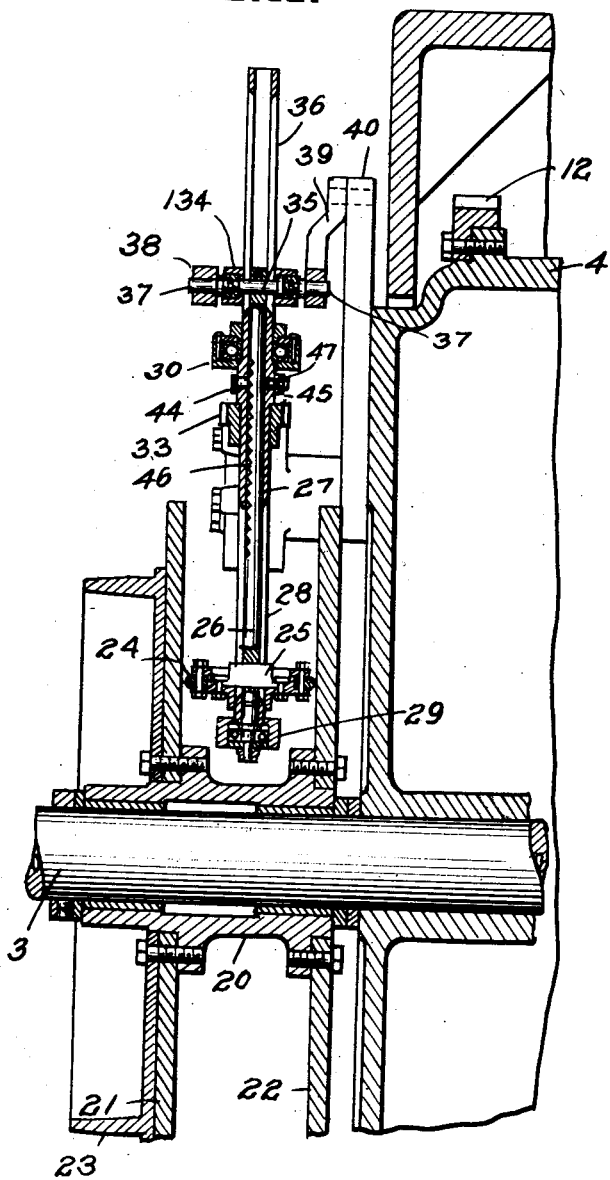
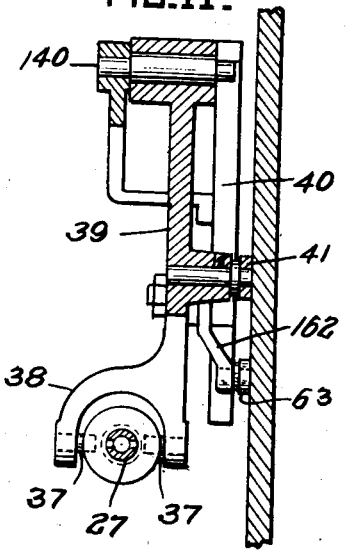
WITNESSES
J. Herbert Bradley.
INVENTOR
Theodore H. Sloan
by Winter Brown & Critchlow
his attorneys

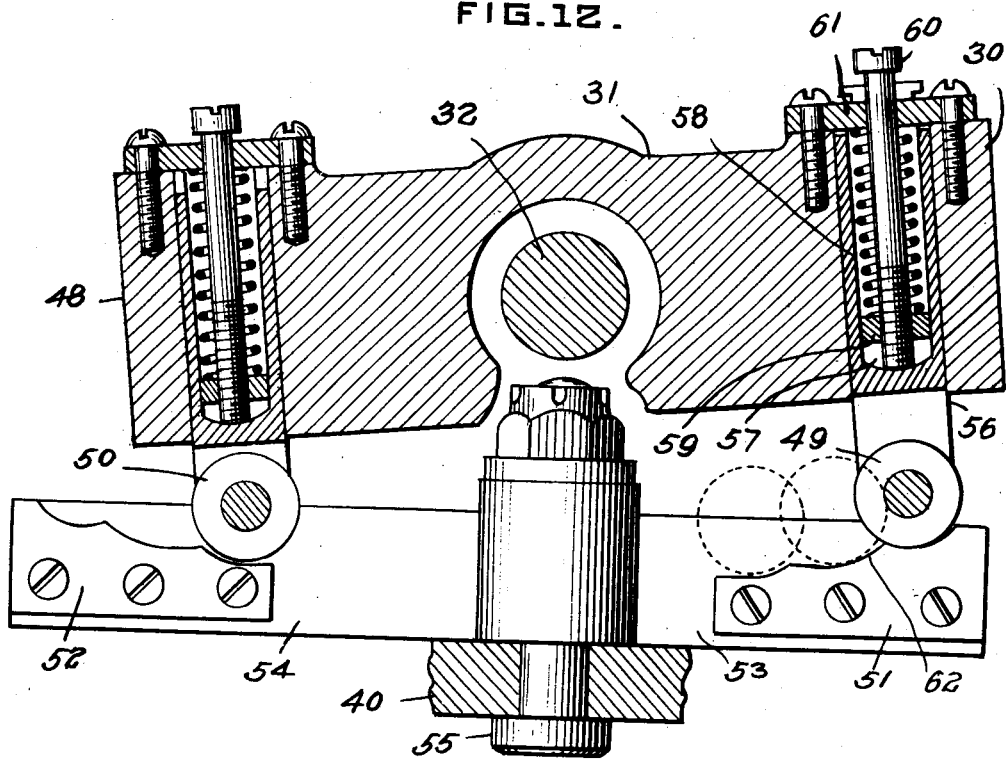

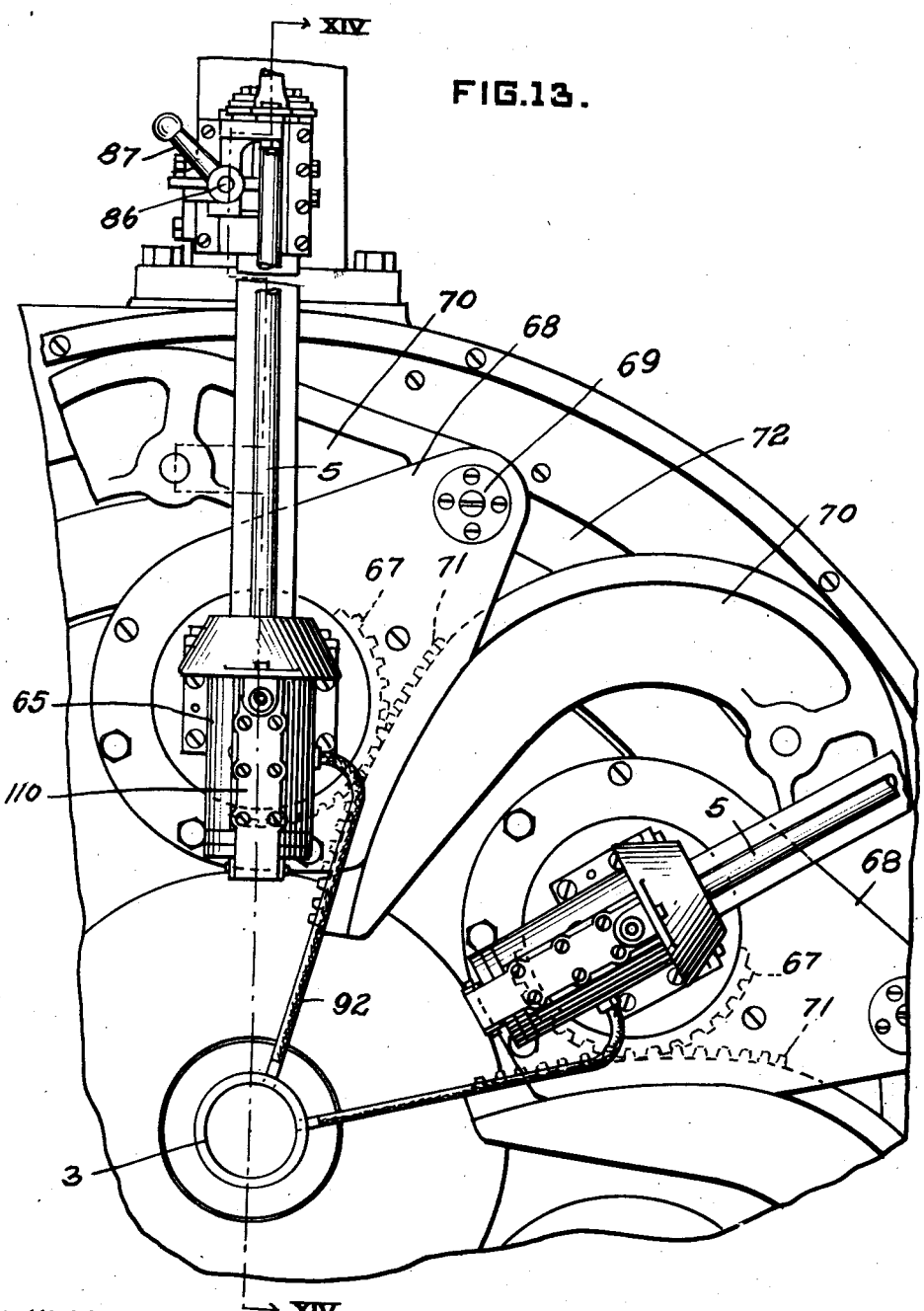

Jan. 18, 1927.
T. H. SLOAN
1,614,632
GLASS FORMING MACHINE
Filed April 26, 1926         9 Sheets-Sheet 8
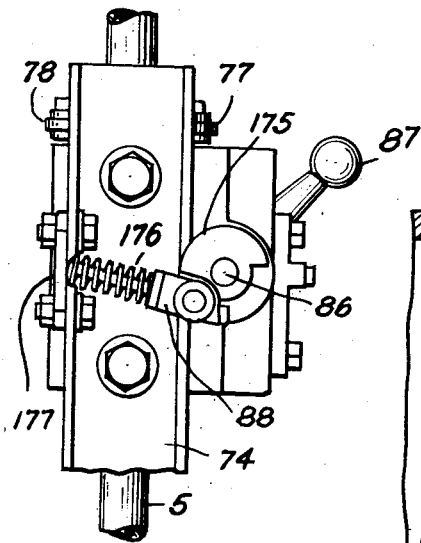
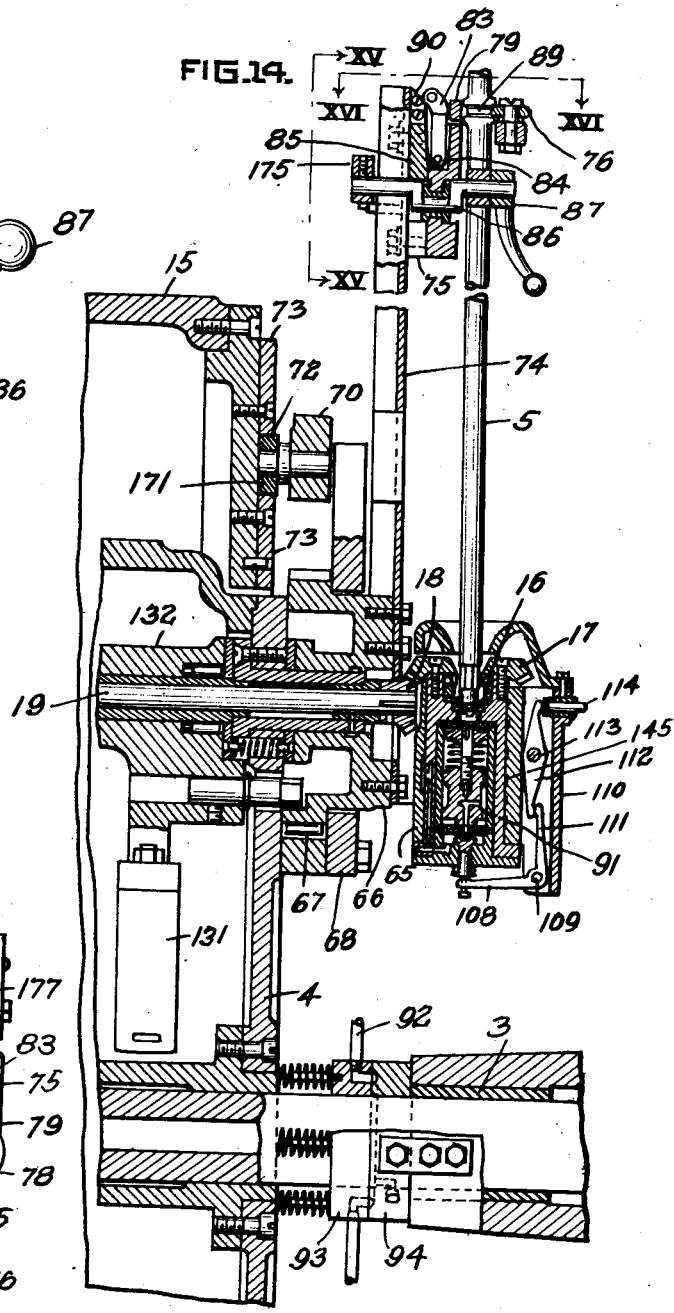
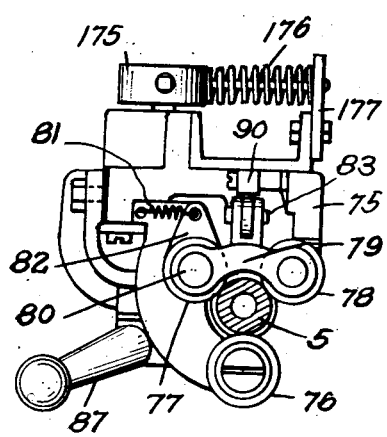
WITNESSES
J. Herbert Bradley.
INVENTOR
Theodore H Sloan
by Winter, Brown & Critchlow
his attorneys.

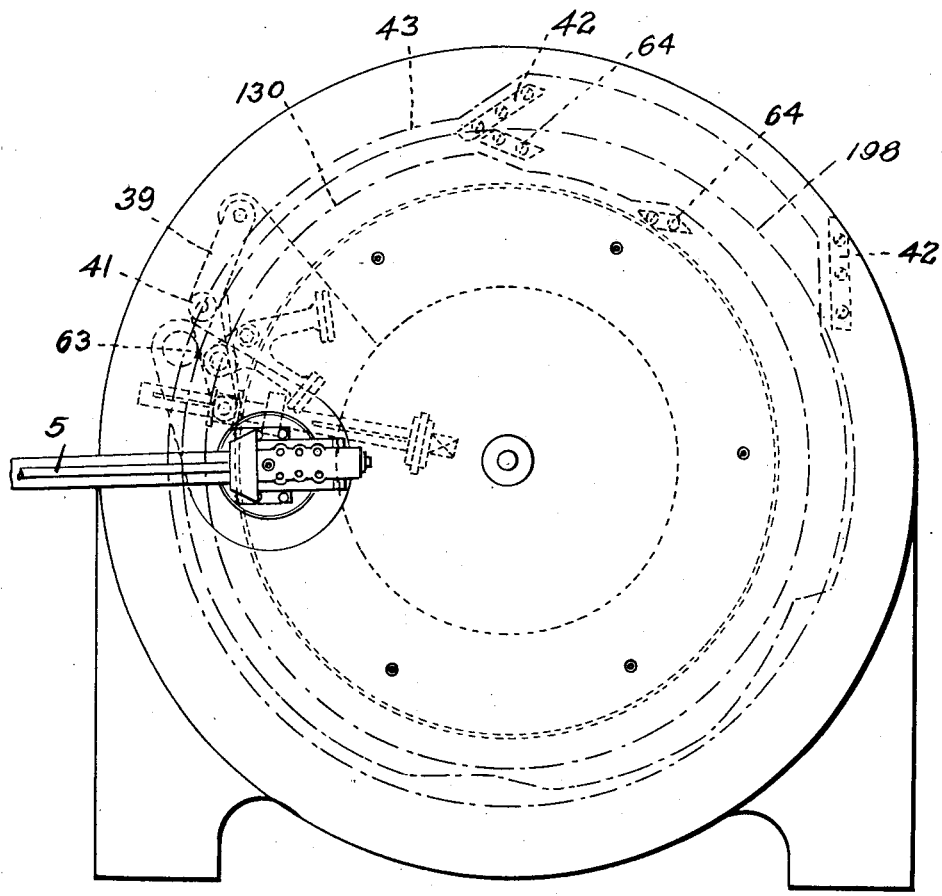

Patented Jan. 18, 1927.

1,614,632

UNITED STATES PATENT OFFICE.

THEODORE H. SLOAN, OF CHARLEROI, PENNSYLVANIA, ASSIGNOR TO MACBETH-EVANS GLASS COMPANY, OF PITTSBURGH, PENNSYLVANIA, A CORPORATION OF PENNSYLVANIA.

GLASS-FORMING MACHINE.

Application filed April 26, 1926. Serial No. 104,524.

In the manufacture of thin-walled blown glassware, a gather of molten glass is first shaped and its surface chilled, then swelled and elongated and then placed in a mold and blown. The shaping and chilling are so conducted that, when the gather is swelled and elongated the molten glass will be properly distributed to produce, when blown, an article of uniform or any desired wall thickness.

The object of this invention is to provide a machine, or machine unit, for rapidly and properly preparing, in the manner generally described, glass blanks for blowing. Although unlimited to the preparation of blanks of any particular size or for any specific purpose, the invention has been found to be well suited for the preparation of larger blanks than have heretofore been satisfactorily prepared by machines.

In the machine provided according to this invention a plurality of gathers are simultaneously and progressively shaped, swelled and elongated into blanks for blowing. The shaping of the gathers is effected on a marver or marvers, which may be of the various forms now used for the purpose in both hand and machine marvering, as for example flat or irregularly shaped plates or blocks. Preferably, however, the marvering is effected upon a long arc-shaped plate over which a plurality of gathers of glass at the outer ends of blow pipes are progressively and simultaneously moved while the blow pipes are rotated. For so moving the gathers, the machine includes a blow pipe carrier which is rotatable, preferably on a horizontal axis. The blow pipes, spaced at suitable angular intervals on the carrier, are mounted for rotation on their longitudinal axes, and also preferably mounted for movements with relation to the carrier so that the outer or gather ends of the pipes may be either retarded or advanced with relation to the movement of the carrier. Also, means are provided for both varying the speed and changing the direction of rotation of the blow pipes.

The blow pipes being borne by a carrier which preferably rotates on a horizontal axis, are first moved upwardly and then downwardly through a substantially circular path. The marvering of a plurality of gathers is progressively effected chiefly while the outer ends of the blow pipes are moved upwardly and the swelling and elongating of the marvered blanks is likewise progressively effected chiefly while the outer ends of the blow pipes are moved downwardly simultaneously with the upward movements of other blow-pipes. For swelling and flaring the blanks, provision is made for introducing small measured volumes of air into them through the blow pipes while the pipes are rotated on their longitudinal axes, and for elongating the blanks the blow-pipes are rotated while in a downward or downwardly-inclined position.

The forming machine may be used as a unit in a full automatic machine which includes provision for mechanically gathering glass upon, or feeding gobs or gathers to blow-pipes, and which also includes blowing mechanism, or it may be used without mechanical correlation with measuring, feeding or blowing mechanism. In the latter case gathering is effected by hand, the blow pipes being detachably connected to chucks borne by the blow-pipe carrier.

Figure 8:
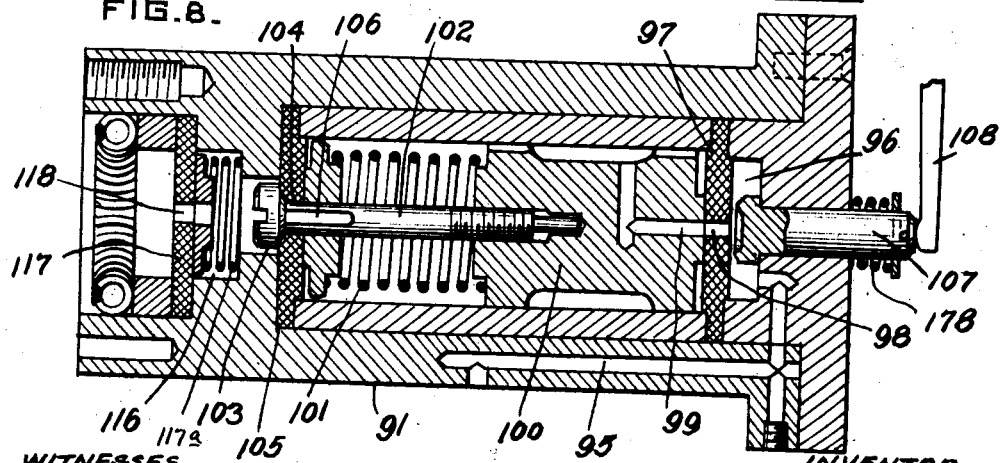

The invention is illustrated in, and also further explained with reference to, the accompanying drawings, although it will be understood that the invention is not limited to the machine specifically shown. Of the drawings, Fig. 1 is substantially a vertical central sectional view of the machine; Fig. 2 an elevation of the front of the machine, or in other words an elevation of the right side of the machine as viewed in Fig. 1; Fig. 3 a plan view to reduced scale of the marver shown in Fig. 2; Figs. 4, 5 and 6 sectional views taken on the lines IV—IV, V—V and VI—VI, Fig. 2; Fig. 7 an elevation of the rear side of the machine, or in other words a view of the left side of the machine as seen in Fig. 1; Fig. 8 a longitudinal central sectional view to enlarged scale of an air-measuring device and control valve presently to be explained; Fig. 9 an elevation to enlarged scale of a unit or mechanism for varying the speed and direction of rotation of a blow pipe, a similar view of the unit being shown to smaller scale on Fig. 7; Fig. 10 a sectional view taken on the line X—X, Figs. 7 and 9; Figs. 11 and 12 detail sectional views taken on the lines XI—XI and XII—XII, Fig. 9, the line XII—XII being broken, and Fig. 12 being to enlarged scale; Fig. 13 a face view to enlarged scale of a blow-pipe support and air-measuring and control valve; Fig. 14 a sectional view taken on the broken line XIV—XIV, Fig. 13; Fig. 15 an elevation to enlarged scale of the outer end of a blow pipe support and locking device, the plane of view being indicated by the line XV—XV, Fig. 14; Fig. 16 an end view of the blow-pipe support and locking device, the plane of view being indicated by the line XVI—XVI, Fig. 14; and Fig. 17 an incomplete elevation of the front of the machine showing particularly the construction and arrangement of cams and dogs for controlling the operation of various units forming parts of the machine.

Having reference now to the illustrative embodiment of the invention, the operating parts of the machine are mounted upon a frame which includes supports 1 and 2 carrying bearings for a rotatable shaft 3 on which there is mounted a blow-pipe carrier preferably in the form of a drum 4. Connections extend from a driving member rotatably mounted on shaft 3 to a plurality of blow-pipes 5 for rotating them on their longitudinal axes, and provision is made for rotating the drum and shaft 3 on which it is mounted. Preferably two motors are provided, one for rotating the driving member and the other for rotating the drum. The former may be a variable speed electric motor 6 which, through a belt 9, rotates the driving member mounted on shaft 3; and the latter a similar motor 6ª which, through a belt 7, pulley 8 and chain of reducing gears illustrated in Figs. 1 and 7, drives a shaft 10 provided with a pinion 11 which meshes with a gear 12 formed on the periphery of drum 4.

The machine shown in the drawings is constructed primarily for forming blanks from bodies of glass gathered manually upon the ends of blow pipes. To this end the front face of drum 4 is provided with a plurality of supports, presently to be explained, for detachably receiving blow pipes. For the sake of simplicity, only one blow pipe support is completely shown in the drawings, although the machine is, as generally indicated, intended to be provided with six of them, and may be provided with more or less as desired.

The drum, as viewed in Fig. 2, is caused to rotate in a clockwise direction to first move the attached blow-pipes upwardly in a circular path with the gathers at their outer ends in contact with a marver 13, which is preferably an arc-shaped plate supported by a plurality of arms 14 attached to, and extending laterally from a frame member 15 surrounding drum 4. The working face of the marver may be constructed to meet the requirements for properly shaping and chilling the surfaces of gathers to be formed into blanks for blowing various articles. As shown herein the working face 10 is a warped surface, the lower or starting end of the plate lying in a rearwardly-inclined plane, as indicated in Fig. 4; the upper or finishing end lying in a forwardly-inclined plane, as indicated in Fig. 6; and the central portion lying in a plane perpendicular to the axis of rotation of drum 4, as indicated in Fig. 5. With this particular form of marver, the glass constituting a gather at the end of a blow-pipe is first worked outwardly, then gradually brought to substantially cylindrical form, and then into substantially conical form with its apex outwardly. These shapes of the gather, progressively effected as it is moved from the lower to the upper end of the marver, are generally indicated by dotted line in Fig. 2 on the marver. As each blow-pipe support approaches the lower end of the marver, a blow-pipe having a gather at its outer end is attached to the support. Thus a plurality of gathers are simultaneously moved progressively upon a single marver.

The inner end of each blow-pipe is attached to a rotatable chuck 16 (Fig. 14) provided with a beveled gear 17 which meshes with a beveled pinion 18 attached to a shaft 19 which extends through drum 4 to its rear face. Driving connections extend to each shaft 19, and each of these connections includes means for varying the speed and preferably, although not necessarily, means for altering the direction of rotation of a blow-pipe.

While various means may be used for thus effecting and controlling the rotation of the blow-pipes on their longitudinal axes, the preferred means are those illustrated to enlarged scale in Figs. 9 and 10. On supporting shaft 3 there is rotatably mounted a sleeve 20 to which there are attached a pair of driving discs 21 and 22 and a pulley 23 for belt 9. Between these discs there are arranged driven discs 24, one forming a part of the driving connections for each blow-pipe chuck 16. Since the driving connections for all of these chucks are the same, the further description of them will be confined to the single connection shown particularly in Figs. 9 and 10.

Disc 24 is mounted for longitudinal sliding movement upon the exterior of a tube 27, and is attached by a key 25 to a rod 26 arranged for longitudinal movement within tube 27, which tube is provided with slots 28 through which key 25 extends. Tube 27 is rotatably mounted in arms 29 and 30 extending laterally from a bracket 31 pivotally supported at the ends of a pintle 32 borne by a bracket 40 attached to drum 4. Attached to tube 27 there is a spiral gear 33 which meshes with a similar gear 34 attached to shaft 19.

For varying the rate of rotation of driven disc 24 by one or the other of driving discs 21 and 22, provision is made for moving the driven disc radially of the driving discs. For this purpose a collar 134 is mounted for longitudinal sliding movement upon the upper end of tube 27 and is attached to rod 26 by means of a key 35 which extends through slots 36 in tube 27. Collar 134 is provided with a peripheral groove of considerable depth for receiving the inner ends of a pair of pins 37 attached to a yoke 38 formed at the end of an arm 39. The other end of this arm is pivoted at 140 to a portion of bracket 40 extending beyond drum 4, and between the ends of this arm there is a roller 41 adapted to be engaged by dogs 42 attached to the rear face of frame 15 at such points as, in the travel of drum 4, it is desired to change the rate of rotation of the blow-pipes.

As viewed in Fig. 9, the movement of drum 4, and the speed-varying units attached to it is counter clockwise. When, for example, roller 41 reaches a dog 42, arm 39 is swung toward the axis of rotation of drum 4, the roller following the general path indicated by the dot-and-dash line 43. This movement of arm 39 causes rod 26 and its attached driven disc to move toward the axis of drum 4, with consequent diminution in the rate of rotation of driven disc 24. Rod 26 is preferably held in its several adjustable positions by means of a detent 44 attached to a collar 45 (Fig. 10) surrounding tube 27, the detent being adapted to engage one of a series of notches 46 formed on the face of rod 26, and being held yieldingly in such engagement by a suitable spring 47 arranged between tube 27 and collar 45.

Means are provided for causing driven disc 24 to bear against one or the other of driving discs 21 and 22, depending upon the desired direction of rotation of the blow-pipe, and also for holding the driven disc in an intermediate position between the driving discs so that it will not be driven by either of them. As previously stated, tube 27 containing rod 26 is supported by arms 29 and 30 extending from bracket 31 which is pivotally mounted through pintle 32 on drum bracket 40. Bracket 31 is provided with an arm 48 extending on the opposite side of pintle 32 from arm 30, which supports the upper end of tube 27. These arms (30 and 48) are provided on their rear faces with rollers 49 and 50 (Fig. 12), respectively, adapted to bear against inclined or wedge-shaped blocks 51 and 52 borne by arms 53 and 54, forming part of a bell crank lever pivoted to bracket 40 at 55. Roller 49 is preferably mounted on the end of a carrier 56 having a central bore 57 in which there is arranged a compression spring 58 acting at one end against a nut 59 attached to a bolt 60, and at its other end against a plate 61 secured to arm 30. Roller 50 is similarly mounted in arm 48. The wedge-shaped blocks 51 and 52 are positioned on arms 53 and 54 with their narrower edges adjacent to each other, and each bracket is provided with three slightly concave recesses 62 for receiving rollers 49 and 50. Attached to arms 53 and 54 there is an arm 162 provided with a roller 63 adapted to be engaged by a series of dogs 64 attached to the rear face of frame member 15. These dogs move arm 162 either toward or from the axis of rotation of drum 4, and accordingly cause arms 53 and 54 to swing on their pivot point 55.

In the position of the parts indicated in Figs. 9 and 12, roller 49 is in the highest recess 62 of block 51 on arm 53, and roller 50 is in the lowest recess 62 of block 52 on arm 54. This, through bracket 31 and the arms 29 and 30, holds driven disc 24 in contact with driving disc 21. When rollers 49 and 50 lie in the intermediate recesses of blocks 51, driven disc 24 is not in contact with either of the driving discs, and accordingly no rotation is imparted to tube 27 and the blow pipe having driving connections extending from it. With the parts in the position opposite to that shown in Figs. 9 and 12, driven disc 24 is held in contact with driving disc 22, with the result that the driven disc is rotated in a direction opposite to that effected when in contact with driving disc 21.

Having reference now to the manner of supporting the blow pipes, the inner end of each blow pipe 5 is, as previously explained, mounted in a rotatable chuck 16 on the front face of drum 4. Each chuck is preferably arranged adjacent to an air-measuring device and control valve for intermittently admitting small predetermined volumes of air into a gather to expand it. The air-control mechanism (the construction of which will presently be explained) and the blow-pipe which is associated with it as the machine operates, are preferably pivotally mounted on drum 4 so that the outer end of the blow-pipe may be retarded and advanced with relation to the rotation of drum 4. In the preferred construction for this purpose a housing 65 (Figs. 13 and 14), in which the air-control mechanism and blow-pipe chuck are mounted, is attached to a rotatable block 66, provided with a segmental gear 67 and held in position upon drum 4 by a plate 68 attached to the drum. As seen in Fig. 13, plate 68 projects outwardly from the axis of rotation of block 66, and to its outer end there is pivoted at 69 one end of an arm 70, the other end of which is provided with gear teeth 71, which mesh with the segmental gear 67 of the block 66 adjacent to the next following plate 68. Intermediate of the ends of arm 70 there is a roller 171 (Fig. 14) which lies in a cam slot 72 formed between guides 73 secured to the front face of frame member 15, so that the rotation of drum 4 causes arm 70 to move inwardly and outwardly according to the configuration of the cam slot. This retards and advances the movement of the outer end of a blow-pipe for purposes that will be explained in the description of the operation of the machine.

For supporting the outer ends of the blow pipes, each block 66 has attached to it a frame which may take the form of a channel 74, the outer end of which is provided with a clamp so constructed that the blow pipe may be readily attached to and detached from the frame, and that when attached to the frame the blow-pipe may readily be rotated on its longitudinal axis. The preferred form of this clamp, illustrated in Figs. 13, 14, 15 and 16, comprises a mounting block 75 attached to channel 74 and supporting three rollers 76, 77 and 78 adapted to engage a groove 89 formed in each blow-pipe. Rollers 76 and 77 are mounted in fixed position on block 75, and roller 78 is mounted at the outer end of an arm 79, pivoted to block 75 at 80, and urged yieldingly outwardly by means of a spring 81 acting on an arm 82 attached to arm 79. For holding arm 79 inwardly, that is to say in blow-pipe engaging position, it is backed by a finger 83 pivoted at 84 to a member 85 mounted for longitudinally sliding movement in block 75 and adapted to be moved by a crank shaft 86 provided with an operating handle 87. The outer end of finger 83 bears against a wedge 90 so that when the finger is moved outwardly it recedes from arm 79 and this permits the arm to move outwardly to receive or release a blow-pipe. Shaft 86 is held in its alternate positions, in which arm 79 is opened and closed, by means of a finger 88 pivoted to a disc 175 attached to shaft 86 (Fig. 15) and urged toward the shaft by a spring 176 the lower end of which bears upon a plate 177 attached to channel 74. When handle 87 is turned to rotate shaft 86, and in consequence thereof to move slide member 85 outwardly, finger 83 no longer holds arm 79 in blow-pipe engaging position, and spring pressed finger 88 holds it in open position.

The preferred construction of the air-measuring and control mechanism will now be explained. As seen in Fig. 14, housing 65 surrounds a rotatable valve casing 91. Each housing is connected by means of a flexible conduit 92 to a ring 93 attached to the hub of drum 4, which ring is spring-pressed against a second ring 94 attached to a bearing of shaft 3 and forms with it a manifold for supplying air to the measuring valve casings during the blank puffing and expanding stage, and for venting the casings during the marvering operations. Between housing 65 and valve casing 91 there is an annular air passageway 145, casing 91 being provided with an air passageway 95 (Fig. 8) through which air from the passageway 145 flows into a pocket 96 formed between the end of the valve casing and a gasket 97. This gasket is provided with a central opening 98 registering with an opening 99 formed in a block 100, mounted in the right end of valve casing 91 for a slight longitudinal movement which is resisted by a spring 101. Attached to block 100 there is a stem 102 provided at its outer end with a valve 103 adapted to close an opening 104 through a gasket 105 at the left end of valve casing 91. Stem 102 is provided with an air passageway 106 so that, when block 100 is moved to the left to unseat valve 103, air may flow from the valve casing through the opening 104 in gasket 105 and into a blow-pipe. Extending through the rear end of casing 91 there is a longitudinally movable stem 107, the inner end of which is cupped to form a closure for the opening 98 through gasket 97, and the outer end of which bears against an arm 108 of a bell crank lever pivoted at 109 to a bracket 110 attached to housing 65 (Fig. 14). A second arm 111 of the bell crank lever bears against one end of a lever 112, pivoted at 113 to bracket 110, the other end of which is adapted to be moved by a stem 114 mounted for longitudinal sliding movement in bracket 110.

Normally, stem 107 is pressed outwardly of the valve casing by a spring 178 (Fig. 8), and in turn stem 114 is, through bell crank lever 108, 111 and lever 112, pressed outwardly of bracket 110. With stem 107 thus pressed outwardly, compressed air flows through passageway 95, gasket opening 98, and passageway 99, into the chamber in valve casing 91 between gaskets 97 and 105. Also, in this position of stem 107, spring 101 holds block 100 to the right and thus causes valve 103 to close the opening 104 through gasket 105. In this manner a predetermined volume of air is stored in the valve casing, which volume may be varied by the size of the casing chamber and the pressure imposed upon the air. To release this air and permit it to flow through a blow-pipe, there is arranged in the path of movement of stem 114 a series of beveled projections 115 (Fig. 1), adjustably clamped to a carrier 179, and varying in number and positions according to the number of puffs of air desired and the desired positions of the blow-pipe when puffing is effected. When stem 114 is engaged by a projection 115, the stem is moved inwardly of bracket 110, and, through lever 112 and bell crank lever 111, 108, stem 107 is pressed inwardly to close the opening 98 through gasket 97, and also to move block 100 to the left sufficiently to cause valve 103 to become unseated from the opening in gasket 105. With the parts in this position, air flows from the valve chamber, and as soon as stem 114 passes beyond a projection 115 the chamber in the valve casing becomes again filled with air at whatever pressure is imposed upon it.

In the operation of blank-forming machines of the type contemplated herein, it is desirable to prevent molten glass from entering the outer end of a blow-pipe and partially or entirely closing its opening. In this machine provision is made for exerting a slight pressure on the air in a blow-pipe as soon as it is attached to the machine, the pressure being sufficient to keep the molten glass from sealing the outer end of the pipe. To accomplish this a pocket 116 (Figs. 8 and 14) is formed in the end of valve casing 91, the inner end of which pocket is closed by valve 103 and the outer end by a flexible diaphragm 117 provided with a central port 118, the diaphragm being yieldingly urged outwardly by a spring 117ª. When no blow pipe is in chuck 16, diaphragm 117 is in the position shown in Fig. 8. When a blow-pipe is placed in chuck 16, which may take the form of an annular coiled spring, and the blow-pipe pressed inwardly to the position required for its engagement by the clamp at the outer end of frame 74, the inner end of the blow-pipe rests upon the outer face of diaphragm 117 with the blow-pipe bore registering with opening 118 in the diaphragm, and the diaphragm is pressed inwardly against the resistance of spring 117ª to the position indicated in Fig. 14. This movement of the diaphragm causes the air entrapped in pocket 116 to be forced into the blow-pipe, and this small volume of air adds sufficient pressure to that in the blow pipe to prevent molten glass at the outer end of the pipe from in any way clogging the blow-pipe.

In forming blanks for the manufacture of some blown glassware, it is desirable to crease or neck the inner ends of the blanks before their elongation and swelling is completed. For this purpose there is attached to the machine a bracket 120 (Fig. 2) which carries a necking bar 121 lying in the path of the downwardly moving blanks. The rotation of a blow-pipe on its longitudinal axis causes a blank at its end to roll upon and become necked by bar 121.

The remaining parts of the machine will be explained in connection with the following description of its operation. During the operation of the machine drum 4 is rotated continuously at a uniform speed which may be determined to meet the requirements for forming blanks for blowing various articles. This rotation is effected by motor 6ª through shaft 10, pinion 11 and gear 12, formed on the periphery of drum 4. Rotation is imparted to each blow-pipe chuck 16 by motor 6 through driving discs 21 or 22, driven disc 24, tube 27, spiral gears 33 and 34, shaft 19, pinion 18 and gear 17.

The rate and direction of rotation of each blow-pipe chuck may be determined and varied to meet the requirements for forming blanks for blowing various articles. In Fig. 17 there is shown an arrangement of dogs 42 for suitably varying the rate of rotation of the blow-pipe chucks to form blanks for blowing combined lamp chimneys and drinking glasses. The dot-and-dash line 43, shown on this figure, indicates the path of roller 41 (Fig. 9) which determines the position of arm 39 attached to rod 26 for adjusting the radial position of driven disc 24. This line shows that the rate of rotation is increased during the final stage of the upward movement of each blow-pipe, it being understood that roller 41 leads the center line of the blow-pipe it controls by about 30°. This change of speed may, if desired, be accompanied by a reversal in direction of rotation, as will be presently explained, and continues during a part of the downward travel of the blow-pipe.

Similarly Fig. 17 shows the arrangement of dogs 64 for controlling the direction of rotation of the blow-pipe chucks when it is desired to do so, and dot-and-dash line 130 shows the path followed by roller 63 (Fig. 9) the position of which determines the direction of rotation of the chucks. This line shows that the direction of rotation is changed during the final stage of the upward movement of each blow-pipe and remains reversed during a short portion of its downward movement.

As each blow-pipe chuck and supporting frame approaches the lower end of marver 13, a blow-pipe having a gather at its outer end is attached to the machine, the inner end of the blow-pipe being inserted in a chuck 16, and its outer end being engaged by the blow-pipe clamp at the end of frame 74. As the drum rotates, the blow-pipes are moved upwardly in a circular path with their gathers in contact with the marver to effect the required shaping of the gathers and chilling of their surfaces.

To keep the marver properly waxed, one or more wax containing receptacles 195 may be attached to its upper edge, as shown in Fig. 1, and be provided with a wick 196 leading through a tube 197 to the face of the marver. The heat of the marver melts the wax so that it flows through the wick in tube 197 when the machine is in operation. When operation stops, the marver cools.

To resist any tendency of the blow-pipe frames to vibrate while the gathers are being marvered, the rotatable blow-pipe supporting block 66 (Fig. 14) preferably has attached to it a counterweight 131. This counterweight is secured to a sleeve 132, which surrounds shaft 19 and is connected to block 66.

When the outer end of a blow-pipe reaches the upper or finishing end of the marver the rate of movement of its outer end is retarded with a consequent movement of the gather towards the axis of drum 4. This movement is effected through lever 70 (Fig. 13) the rack 71 of which engages pinion 67 formed on block 66, and which lever is caused to move away from the axis of rotation of drum 4 by roller 171 traveling in the cam slot formed between guides 73, the path of the roller being indicated in Fig. 17 by the dot-and-dash line 198. By thus retarding the movement of the outer end of the blow-pipe the blank is held in a vertical position to assist in its proper formation. The removal of a marvered blank from the marver is effected by the engagement of a blow-pipe by the periphery of an idle roller 200 (Figs. 2 and 7) adjustably mounted in a bracket 201 attached to the end of the marver. When the blow-pipe reaches roller 200 it is pressed outwardly by the roller so that the blank moves laterally from the marver. After a gather has passed beyond the marver, its movement with relation to the drum is increased to bring the gather to a downwardly-inclined position, and in such position its movement is variously modified for properly flaring and elongating it.

During the downward movement of the blow-pipes, the gathers are enlarged or swelled by intermittently causing measured volumes of air to flow through the blow-pipes, this being effected by the air-measuring and controlling device illustrated in Figs. 8 and 14, the operation of which has been fully explained in connection with its description. By varying the position and number of projections 115 (Fig. 2) the air-measuring and controlling device may be operated to effect any desired swelling of the blanks by intermittently puffing them. The changes in forming the blanks as they are moved downwardly subsequent to marvering are generally indicated in Fig. 2. When a blank has reached a removal position, such as the last indicated on this figure, it is in proper condition for blowing, and the blow-pipe is accordingly detached from drum 4 and transferred to a blowing machine.

It is characteristic of the preferred embodiment of this invention that a plurality of gathers are simultaneously marvered, swelled and elongated to form blanks for blowing, and that this is effected by causing blow-pipes with gathers at their outer ends to move in a continuous circular path, first upwardly and then downwardly, the marvering of a plurality of gathers being simultaneously and progressively effected during the upward and a portion of the downward movement of the blow-pipes, and the ensuing swelling and elongating of the marvered gathers, being also simultaneously and progressively effected during the remainder of the downward movement of the blow-pipes. In actual use of the machine it has been found that good blanks may be very rapidly formed regardless of the size of the blanks. The machine has been used commercially for forming blanks for blowing combined lamp chimneys and drinking glasses, and vases, which blanks require the treatment of larger gathers than have heretofore been successfully formed by machines.

According to the provisions of the patent statutes, I have described the principle and operation of my invention, together with a machine which I now consider to represent the best embodiment thereof. However, I desire to have it understood that, within the scope of the appended claims, the invention may be practiced by other forms of construction than that particularly illustrated and described.

I claim as my invention:

1. In a machine for preparing glass blanks for blowing, the combination of a forming plate, and means for simultaneously moving a plurality of gathers progressively upon said plate to shape them and chill their surfaces.

2. In a machine for preparing glass blanks for blowing, the combination of an arc-shaped forming plate, and means for simultaneously moving a plurality of gathers progressively upon said plate to marver them.

3. In a machine for preparing glass blanks for blowing, the combination of an arc-shaped forming plate, and means for simultaneously moving a plurality of gathers progressively upon said plate and for rotating them upon their longitudinal axes as they are moved upon the plate.

4. In a machine for preparing glass blanks for blowing, the combination of a forming plate, means for simultaneously moving a plurality of gathers progressively upon the said plate to marver them, and independent means for rotating each of the gathers on its longitudinal axis at a variable angular velocity.

5. In a machine for preparing glass blanks for blowing, the combination of an extended arc-shaped forming plate, means for simultaneously moving a plurality of gathers progressively upon said plate, means for rotating the gathers on their longitudinal axes as they are moved upon the plate, and means for varying the angular velocity of rotation of the gathers.

6. In a machine for preparing glass blanks for blowing, the combination of a plate for marvering gathers, a rotary carrier provided with a plurality of blow pipes, and means for rotating said carrier to cause gathers at the outer ends of the blow pipes to be simultaneously moved upon and marvered by said plate.

7. In a machine for preparing glass blanks for blowing, the combination of an arc-shaped marvering plate, a rotary carrier provided with a plurality of blow pipes, means for rotating said carrier to cause a plurality of gathers at the outer ends of said blow pipes to be simultaneously moved progressively upon said plate to marver them.

8. In a machine for preparing glass blanks for blowing, the combination of an upright forming plate, a carrier rotatable upon a horizontal axis and provided with a plurality of blow pipes, and means for rotating said carrier to cause gathers at the outer ends of said blow pipes to be simultaneously moved upon and marvered by said plate.

9. In a machine for preparing glass blanks for blowing, the combination of a forming plate, a rotary carrier provided with a plurality of blow pipes, means for rotating said carrier to cause gathers at the outer ends of the blow pipes to be simultaneously moved upon said plate, means for rotating said blow pipes on their longitudinal axes, and means for varying independently the rate of rotation of each of said blow pipes.

10. In a machine for preparing glass blanks for blowing, the combination of a marver, a rotary carrier provided with a blow pipe having its outer end adjacent to said marver, connections for rotating said blow pipe including a driving disc and a driven disc, and means controlled by the rotation of said carrier for moving said driven disc radially of said driving disc to vary the speed of rotation of said blow pipe.

11. In a machine for preparing glass blanks for blowing, the combination of a marver, a rotary carrier provided with a blow pipe having its outer end adjacent to said marver, connections for rotating said blow pipe including a pair of driving discs and a driven disc arranged between them, and means controlled by the rotation of said carrier for moving said driven disc with relation to said driving discs to alter the direction of rotation of said blow pipe.

12. In a machine for preparing glass blanks for blowing, the combination of a marver, a rotary carrier provided with a blow pipe having its outer end adjacent to said marver, connections for rotating said blow pipe including a driving and a driven disc, means controlled by the rotation of said carrier for adjusting such driven disc radially of said driving disc to vary the speed of rotation of said blow pipe, and means independent of said adjusting means for holding said driven disc in its adjustable positions.

13. In a machine for preparing glass blanks for blowing, the combination of a marver, a rotary carrier provided with a blow pipe having its outer end adjacent to said marver, connections for rotating said blow pipe including a pair of driving discs and a driven disc arranged between them, means controlled by the rotation of said carrier for moving said driven disc with relation to said driving discs to change the direction of rotation of said blow pipe, and means controlled by the rotation of said carrier for moving said driven disc radially of said driving discs to vary the speed of rotation of said blow pipe.

14. In a machine for preparing glass blanks for blowing, the combination of a frame, a marver, a carrier rotatable with relation to said frame and provided with a blow pipe having its outer end adjacent to said marver, connections for rotating said blow pipe including a driving disc and a driven disc mounted for radial movement with relation to the driving disc, an arm pivoted on said carrier and connected to said driven disc, and means borne by said frame for moving said arm to adjust the radial position of said driven disc upon said driving disc.

15. In a machine for preparing glass blanks for blowing, the combination of a frame, a marver, a carrier rotatable with relation to said frame and provided with a blow pipe having its outer end adjacent to said marver, connections for rotating said blow pipe including a pair of driving discs and a driven disc arranged between and mounted for movement with relation to the driving discs to change the direction of rotation of the said blow pipe, an arm pivoted on said carrier and connected to said driven disc, and means borne by said frame to move said arm to change the position of said driven disc with relation to said driving discs.

16. In a machine for preparing glass blanks for blowing, the combination of a frame, a marver, a carrier rotatable with relation to said frame and provided with a blow pipe having its outer end adjacent to said marver, connections for rotating said blow pipe including a pair of driving discs and a driven disc arranged between them, said driven disc being mounted for movement both radially and laterally with relation to the driving discs, and a pair of arms each pivotally mounted on said carrier and each connected to said driven disc, and means borne by said frame to move said arms to adjust the position of said driven disc both radially and laterally with relation to said driving discs to vary the rate and direction of rotation of said blow pipe.

17. In a machine for preparing glass blanks for blowing, the combination of a carrier rotatable on a horizontal axis and provided with a blow pipe, means for rotating said carrier to move the blow pipe through a continuous circular path first upwardly and then downwardly, means for marvering a gather on the blow pipe during its upward movement, and means for swelling and elongating the marvered gather during its downward movement.

18. In a machine for preparing glass blanks for blowing the combination of a carrier rotatable on a horizontal axis and provided with a blow pipe, means for rotating the carrier to move the blow pipe through a continuous circular path first upwardly and then downwardly, means for rotating the blow pipe on its longitudinal axis, means for marvering a gather on the blow pipe during its upward movement, and means for swelling and elongating the marvered gather during its downward movement.

19. In a machine for preparing glass blanks for blowing, the combination of a carrier rotatable on a horizontal axis and provided with a blow pipe, means for rotating the carrier to move the blow pipe through a continuous circular path first upwardly and then downwardly, a plate for marvering a gather on the blow pipe during its upward movement, and means for admitting measured volumes of air into the marvered gather during its downward movement.

20. In a machine for preparing glass blanks for blowing, the combination of a carrier rotatable on a horizontal axis and provided at angular intervals with a plurality of blow-pipes each rotatable on its longitudinal axis, means for rotating said carrier to move said blow-pipes through a continuous circular path, and means simultaneously effective for marvering gathers on the outer ends of blow-pipes that are being moved upwardly and swelling and elongating marvered gathers on blow pipes that are being moved downwardly.

21. In a machine for preparing glass blanks for blowing, the combination of a carrier rotatable on a horizontal axis, and provided at angular intervals with a plurality of blow-pipes each independently rotatable upon its longitudinal axis, means for rotating said carrier to move said blow-pipes in a continuous circular path, an arc-shaped plate adjacent to the upwardly moving side of said carrier for simultaneously marvering gathers by a plurality of upwardly moving blow-pipes, and means for swelling and elongating a plurality of marvered gathers borne by downwardly moving blow-pipes.

22. In a machine for preparing glass blanks for blowing, the combination of a marvering plate, a rotatable carrier provided with a blow-pipe, means for rotating said carrier to cause a gather at the outer end of the blow-pipe to move upon and be marvered by said plate, and means for moving the outer end of the blow-pipe laterally of said plate at the finishing end thereof to remove the gather from the plate.

23. In a machine for preparing glass blanks for blowing, the combination of a carrier rotatable upon a horizontal axis, a rotatable blow-pipe mounted upon said carrier for movement with relation thereto, a marvering plate, means for rotating said carrier to move said blow pipe in a continuous circular path first upwardly adjacent to said plate and then downwardly, and means for moving said blow-pipe with relation to said carrier first to retard the movement of the outer end of the blow-pipe at the finishing end of said plate and then to increase the movement of the gathered end of the blow-pipe to bring it rapidly into a downward position for flaring and elongating a blank.

24. In a machine for preparing glass blanks for blowing, the combination of a frame, a drum mounted thereon for rotation on a horizontal axis, a plurality of rotatable blow-pipes mounted on one side of said drum, and driving connections for rotating said blow-pipes, each connection including a speed-varying element mounted on the other side of said drum.

25. In a machine for preparing glass blanks for blowing, the combination of a frame, a drum mounted thereon for rotation on a horizontal axis, a plurality of rotatable blow-pipes mounted on one side of said drum, driving connections for rotating said blow-pipes, each connection including a speed-varying element mounted on the other side of said drum, and a single means for driving said elements.

26. In a machine for preparing glass blanks for blowing, the combination of a marvering plate, a rotatable carrier, a housing rotatable on said carrier, a blow-pipe rotatably mounted in said housing, means for rotating said carrier to marver a gather on the end of said blow-pipe, and means acting upon said housing to resist vibration of the housing during the marvering.

27. In a machine for preparing glass blanks for blowing, the combination of an arc-shaped forming plate, a rotatable carrier provided with a plurality of rotatable chucks for detachably receiving the inner ends of blow pipes, and means for rotating said carrier to cause gathers at the outer ends of blow pipes borne by said chucks to be simultaneously moved upon and marvered by said plate.

28. In a machine for preparing glass blanks for blowing, the combination of a stationary marvering plate, a rotary carrier provided with a plurality of angularly spaced chucks for detachably receiving the inner ends of blow pipes, means for rotating said carrier to cause gathers at the outer ends of the blow pipes to be simultaneously marvered upon said plate, means for rotating said chucks, and means for varying the rate of rotation of said chucks.

29. In a machine for preparing glass blanks for blowing, the combination of a carrier rotatable on a horizontal axis and provided with a chuck for detachably receiving the inner end of a blow pipe, means for rotating said carrier to move said chuck and its attached blow pipe through a continuous circular path first upwardly and then downwardly, means for marvering a gather on the outer end of the blow pipe during its upward movement, and means for swelling and elongating the gather during its downward movement.

30. In a machine for preparing glass blanks for blowing, the combination of a carrier rotatable on a horizontal axis and provided at angular intervals with a plurality of rotatable chucks for detachably receiving the inner ends of blow pipes, means for rotating said carrier to move blow pipes borne by said chucks through a continuous circular path, and means simultaneously effective for marvering the gathers on the outer ends of the blow pipes that are being moved upwardly and for swelling and elongating the marvered blanks that are on the outer ends of the blow-pipes being moved downwardly.

In testimony whereof, I sign my name.

THEODORE H. SLOAN.